E. A. RUCK.
CLOSURE OPERATING MECHANISM.
APPLICATION FILED MAR. 22, 1919.

1,364,954.

Patented Jan. 11, 1921.
4 SHEETS—SHEET 1.

Inventor
Ernest A Ruck.
By Lancaster and Allwine
Attorneys

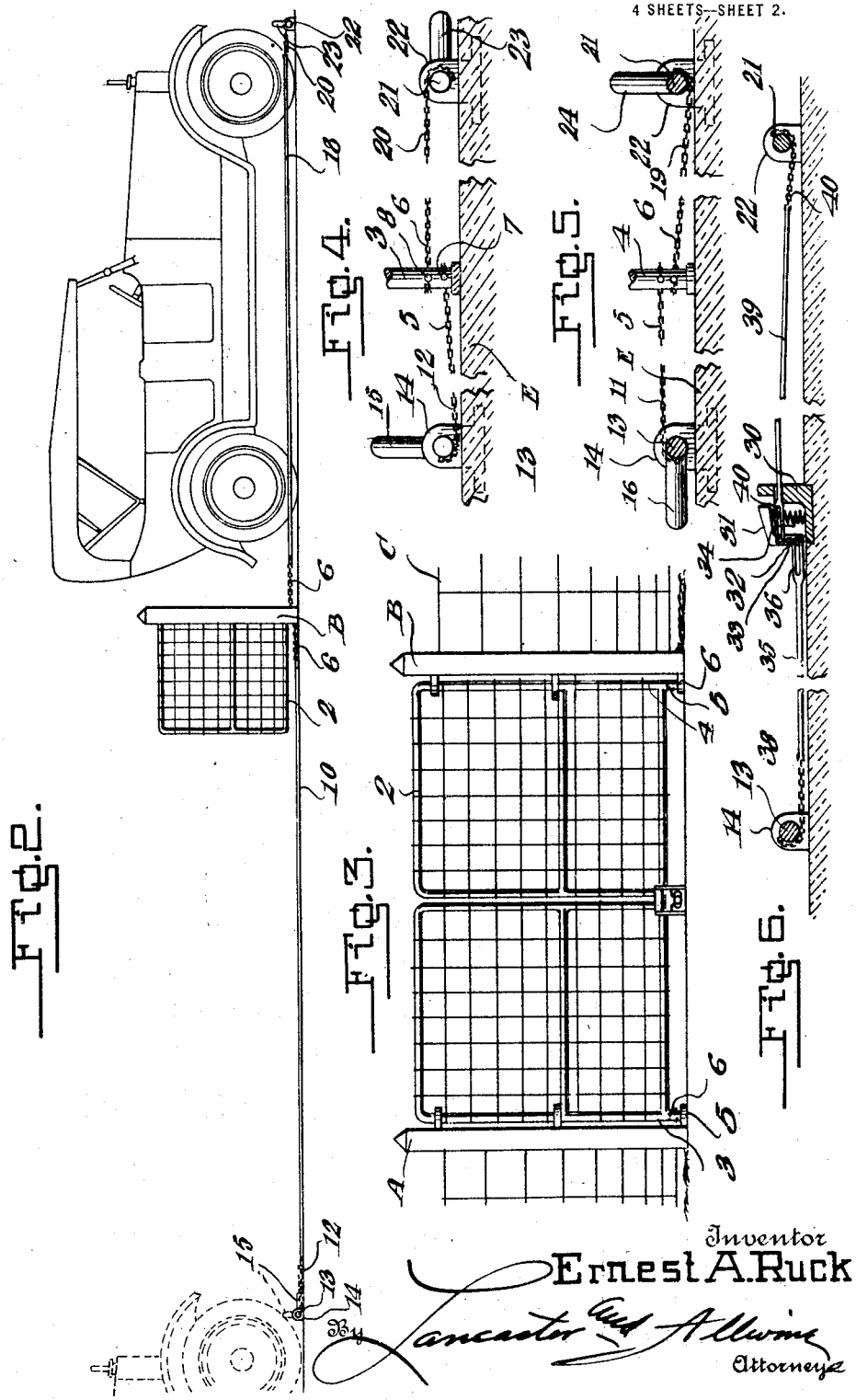

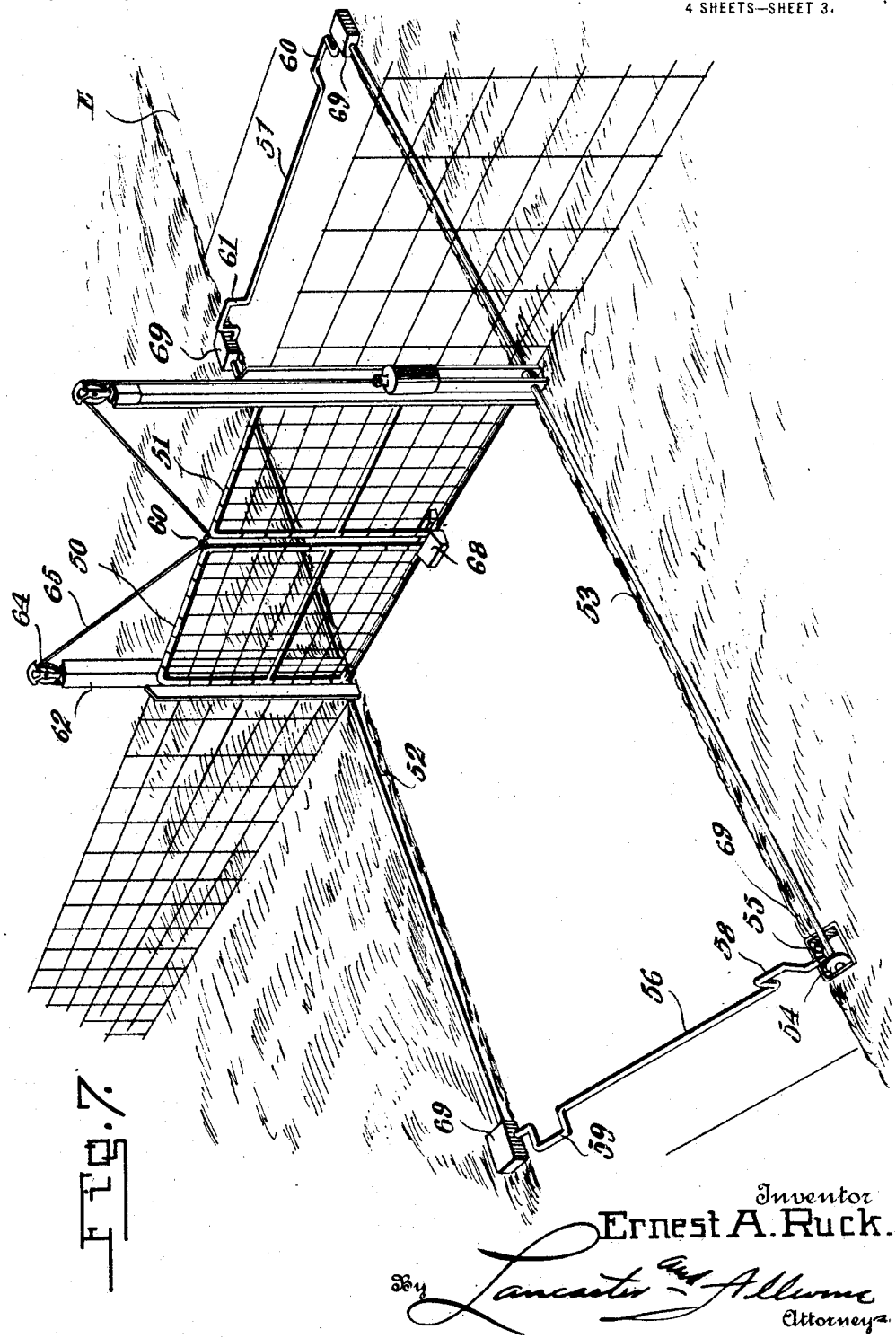

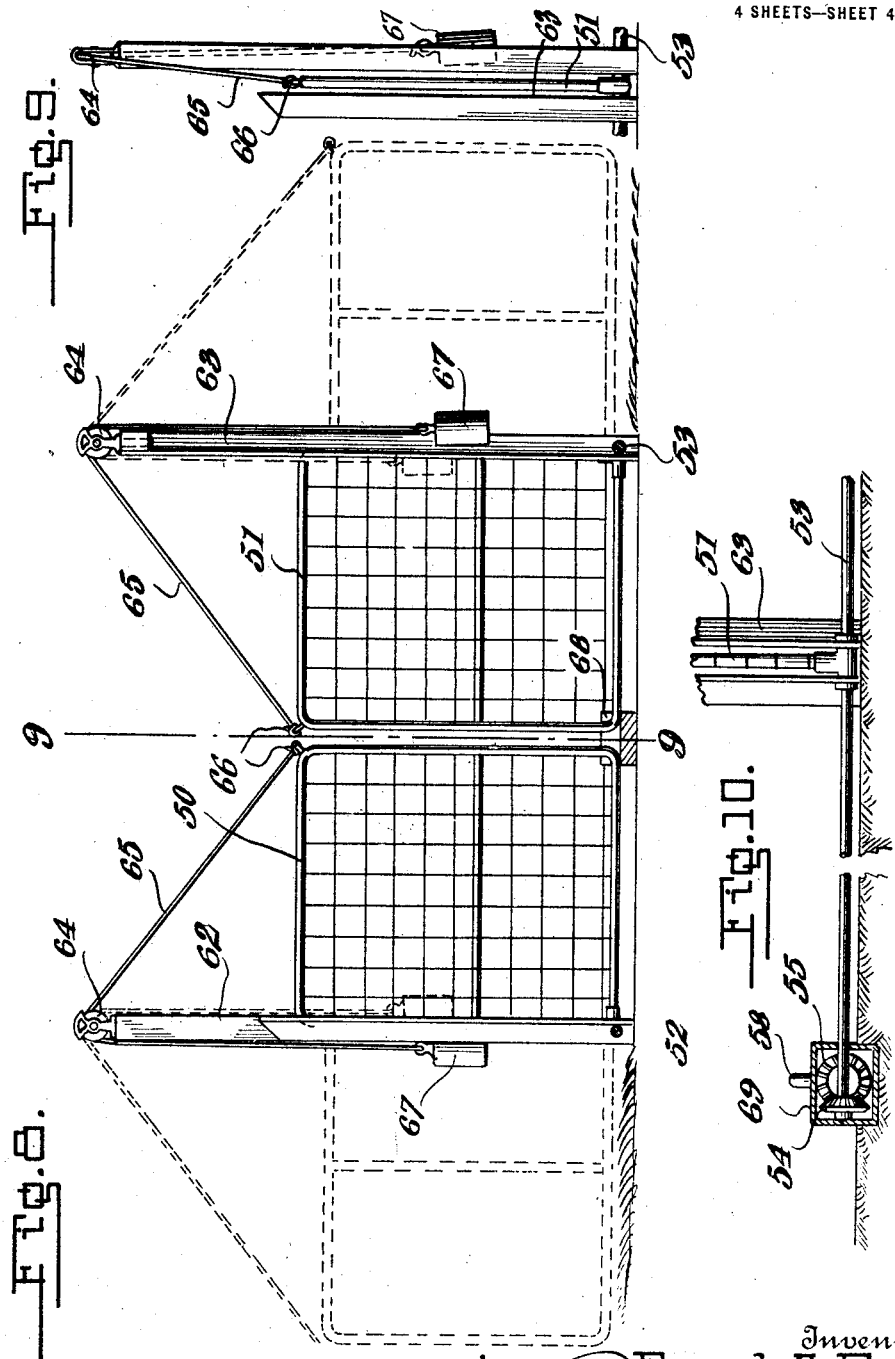

UNITED STATES PATENT OFFICE.

ERNEST A. RUCK, OF CENTURIA, WISCONSIN.

CLOSURE-OPERATING MECHANISM.

1,364,954.                    Specification of Letters Patent.    Patented Jan. 11, 1921.

Application filed March 22, 1919. Serial No. 284,234.

*To all whom it may concern:*

Be it known that I, ERNEST A. RUCK, a citizen of the United States, residing at Centuria, in the county of Polk and State of Wisconsin, have invented certain new and useful Improvements in Closure-Operating Mechanism, of which the following is a specification.

This invention relates to operating mechanism for closures, such as gates, garage doors, or the like, and an object of the invention is to provide a vehicle operated mechanism for opening and closing such closure members.

An object of the invention is to provide, in combination with swingable closure members, a plurality of obstructions positioned in the path of a vehicle approaching or leaving the said closure members, and arranged in such manner that when one of said obstructions is engaged by a vehicle approaching the closure, the said obstruction will be depressed for operating suitable mechanism to swing the closure members into an open position while another of the obstructions will be engaged by a vehicle leaving the closure members for operating suitable mechanism for moving the said closure members into their normal closed positions.

Another object of the invention is to provide suitable latch means in the form of a rigid abutment, and a movable abutment or latch member for normally maintaining the closure members against opening movement, and to connect said movable abutment with certain of said obstructions whereby the said movable abutment will be moved out of the path of the gate upon the depression of the abutment engaged by a vehicle approaching the closure members, to permit the said closure members to be swung into an open position.

A still further object of the invention is to provide a pair of obstructions upon each side of the closure members, one of which is always in an obstructing or upward position to be engaged by the wheel of a vehicle, while the other is in a depressed position, and which obstruction members are spaced a greater distance apart than the normal tread of the vehicle, consequently only one of the obstruction members of each pair upon the same side of the closure members will be engaged and operated by the vehicle passing through the gate or door which is closed by the said closure members.

Other objects of the invention will appear in the following detailed description taken in connection with the accompanying drawings, forming a part of this specification, and in which drawings:

Fig. 2 is a side elevation of the closure member swung into an open position and shows the operating mechanism connected thereto, also showing the different positions of a vehicle in respect to the said operating mechanism.

Fig. 3 is a front elevation of the closure member.

Fig. 4 is a fragmentary view illustrating the obstructions and their manner of connection to the swingable closing member.

Fig. 5 is a view similar to Fig. 4 illustrating the obstructions in different positions.

Fig. 6 is a fragmentary section illustrating the latch or abutment mechanism for preventing accidental swinging movement of the closures.

Fig. 7 is a perspective view of a modified form of the closure operating mechanism.

Fig. 8 is a front elevation of the modified form of closure operating mechanism.

Fig. 9 is a vertical section taken on the line 9—9 of Fig. 8, and

Fig. 10 is a fragmentary sectional view illustrating the manner of connecting the obstruction members to the swingable closure members.

Figure 1:
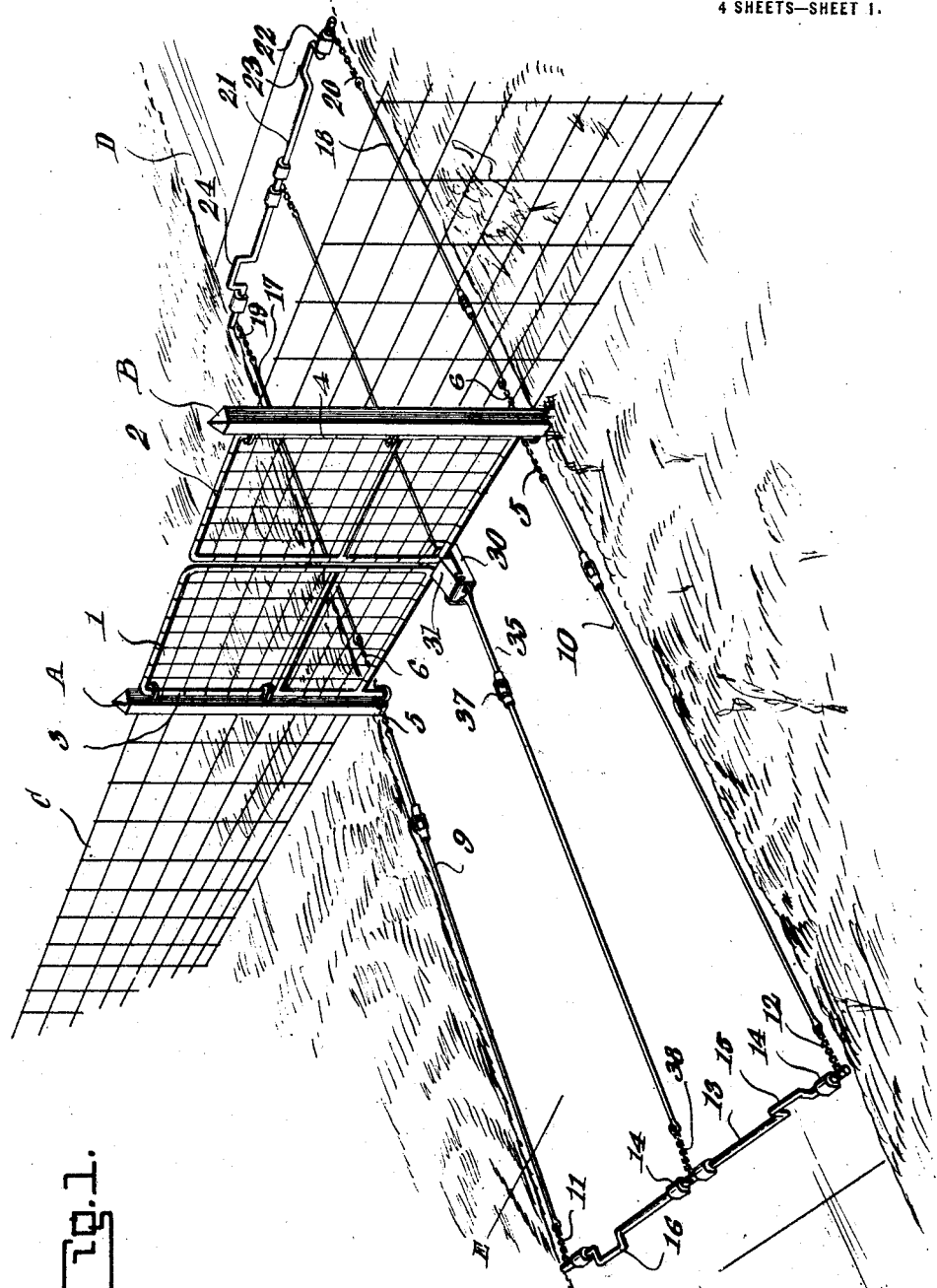
Figure 1 is a perspective view of a closure member showing the improved operating mechanism connected thereto.

Referring more particularly to the drawings, A and B indicate the supports for the swingable closure members 1 and 2, which in the illustrated form of the invention are gates, forming closures for highway openings through the fence C. The gates 1 and 2 are connected to the posts A and B for swinging about vertical axes and the inner side rods 3 and 4 thereof respectively, have chains or analogous flexible devices 5 and 6 connected thereto. As will be seen by particular reference to Figs. 4 and 5 of the drawings, the chains 5 are connected to the posts 3 and 4 by suitable fastening means indicated at 7 and bent about the post in a direction opposite to the direction in which the chains 6 extend about the post which latter chains are attached to the post adjacent to the point of connection between the chains 5 and the post, in any suitable manner as indicated at 8. The chain 5 which is connected to the post 4 is connected thereto above the point of connection of the chain 6 which is connected to the said post 4, as shown in Fig. 5 of the drawings.

Rods 9 and 10 are connected to the chains 5 and they have chains or flexible members 11 and 12 connected to their outer ends respectively, which chains or flexible members are in turn connected to a rod 13 which extends transversely of the highway D. The rod 13 is rotatably supported by suitable bearing members 14, which may be anchored in the cementitious section E of the highway D, as it is desirable to provide a paved portion of the highway upon each side of the gates 1 and 2. The rod 13 has cranks 15 and 16 formed thereon at substantially right angles to each other so that when one of the cranks is in a vertical position the other lies horizontal.

Rods 17 and 18 are connected to the chains or flexible members 6 which are in turn connected to the posts 3 and 4 and they have chains or analogous flexible members 19 and 20 connected to their outer ends. The flexible members 19 and 20 are connected to opposite ends of a second rod 21 which extends transversely of the highway D and is rotatably supported by suitable bearings 22. The rod 21 like the rod 13 is provided with a pair of crank portions 23 and 24 positioned at right angles to each other, one of which rod portions is adapted to extend vertically while the other lies in a horizontal position. The crank portions 23 and 24 are arranged, with respect to the crank portions 15 and 16 so that when the crank 15 which alines with the crank 23 is in a vertical position, the crank 23 will be in a horizontal position and vice versa, while the cranks 16 and 24 are arranged so that when one of them is in a vertical position the other will lie in a horizontal position. The cranks 15 and 16, and the cranks 23 and 24 are spaced, a greater distance than the normal tread of vehicles, so that only one of them will be engaged by a vehicle approaching or leaving the gates 1 and 2.

A rigid abutment 30 is provided to prevent the swinging of the gates to the right, reference to Fig. 1 of the drawings, and a movable abutment or lock 31 is provided to prevent the accidental swinging of the gates or closures 22 into open position or toward the left. This movable abutment 31 is provided with a depending shank portion 32 pivotally supported intermediate its ends as shown at 33. An extension spring 34 is provided to normally maintain the abutment 31 in position to prevent the swinging of the gates 1 and 2. A rod 35 is connected by means of a slot and pin connection as shown at 36 to the shanks 32 below the pivots 33 thereof and this rod preferably has a turnbuckle structure 37 interposed therein to permit adjustment of its length. A flexible member such as a chain or the like 38 is connected to the outer end of the rod 35 and is also connected to the transversely extending rod 13, for depressing the movable abutment 31 upon the rocking of the rod 13 to permit the gate to swing open.

A rod 39 is connected by means of a slot and pin connection 40 to the shank 32 of the movable abutment 31 above its pivot 33. The chain or flexible member 40 is connected to the outer end of the rod 39 and to the transversely extending rod 21, for rocking the movable abutment 31 upon its pivot when the rod 21 is rocked or rotated by the vehicle.

In operation; referring to Fig. 1: when a vehicle approaches the gates 1 and 2 from the left, the outer front wheel thereof will engage the upstanding crank or obstruction 15 and rock the rod 13. This rocking of the rod 13, will owing to the fact that a chain 38 is much tighter than the chains 11 and 12, and also the connection between the rod 35 and the crank is shorter than the connection between the rod 13 and the posts 3 and 4 of the gates, first rock the movable abutment 31 upon its pivot 33 depressing it, after which the rotation of the rod 13 will open the gates or closures 1 and 2 owing to the fact that the chains 5 which are connected to the rods 9 and 10 extend around the posts 3 and 4 of the gates in such manner that the rocking of the rods 13 by a vehicle approaching the gates will swing the gates to an open position. During the pivotal movement of the movable abutment 31, under action of the rod 35, the pin of the pin and slot connection 40 will ride in the slots thereof permitting the necessary movement of the movable abutment without affecting the rod 39. The swinging of the gates 1 and 2 into an open position will also rock the rod 21 moving the crank or obstruction 23 which is normally in a horizontal position into a vertical position so that it will be engaged by the front outer wheel of the vehicle after the latter has passed through the gate opening and this will rock the rod 21 and move the gates 1 and 2 into a closed position owing to the manner of connection of the chain 6 with the posts 3 and 4 of the gate structure. When the gates 1 and 2 are swung into closed position, they will, owing to the slant or incline of the upper surface of the movable abutment 31 depress this against the action of the spring 34 and swing until they engage the rigid abutment 30 which will limit their closing swinging movement.

When a vehicle approaches the gates 1 and 2 from the right of Fig. 1, the outer front wheel will engage the upstanding crank or obstruction 24, rocking the rod 21 in a reverse direction from which it is rocked by a vehicle approaching the gates from the left, and this will swing the gates 1 and 2 into an open position after first depressing the movable abutment 31 through the medium of the rod 39 during which depressing movement, the pin of the slot and pin connection 36 will ride freely in the slot, without disturbing the rod 35. After the vehicle has passed through the gate opening it will engage the obstruction or crank 16 which will have been moved into a vertical position by the swinging of the gates 1 and 2 into an open position, and operate the mechanism for closing the gates.

In Figs. 7 to 10 inclusive, of the drawings, a modified form of closure operating means therefor is disclosed. In this form, the gates or closure members 50 and 51 are mounted to swing upon pivots at their lower outer corners, and on horizontal axis, the said closure members being connected to rods 52 and 53 respectively which extend parallel with the highway D along each side of the same for predetermined distances along each side of the closure member. The rods 52 and 53 have beveled gears 54 upon their opposite ends which mesh with beveled gears 55 mounted upon the ends of rods 56 and 57 respectively. The rods 56 and 57 extend transversely of the highway D at proper distances from the closure members to permit these closure members to be operated by a vehicle, upon the approach of the vehicle thereto to open them to allow the vehicle to pass through the gate openings. The rod 56 is provided with a pair of crank portions 58 and 59 positioned at substantially right angles to each other while the rod 57 has crank portions 60 and 61 formed therein which are also positioned at right angles to each other. Certain of these crank members are adapted to extend vertically, to form obstructions adapted to be engaged by one of the wheels of the vehicle, to rotate the rods 56 or 57 and consequently rotate the rods 52 and 53 to move the closure members 50 and 51 upon their pivotal axis. The cranks 58 and 59 and the cranks 60 and 61 are spaced, so that only one of the cranks upon each of the rods will be engaged by a vehicle approaching or leaving the closure members 50 and 51.

The gate posts 62 and 63 of the gate structure are elongated, project above the upper edges of the gate or closure members 50 and 51. Guarded sheaves 64 are swivelly carried by the upper end of these posts 62 and 63 and cables or analogous flexible devices 65 extend over these guarded sheaves. The cables 65 are connected to the upper inner corners of the gates 50 and 51 as shown at 66 and their ends which extend from these points of connection with the gates over the sheaves have weights 67 connected thereto, which counter-balance the gates during their pivotal opening and closing movements and prevent a sudden jar or shock to the gates by their striking the ground when reaching the terminus of either their opening or closing movement.

A flange block 68 is positioned centrally of the highway or roadway having a space between its flanges for receiving the lower inner corners of the gates or closure members 51 to prevent lateral movement thereof.

Suitable gear housings or boxes 69 may be provided for inclosing the beveled gears 54 and 55 and protecting them from dust or other foreign material.

In operation; when a vehicle is approaching the closure member from the left, referring to Fig. 7 of the drawings, the outer front wheel of the vehicle will strike the upstanding crank portion or obstruction 58, and depress it, rocking the rods 56 and through the medium of the beveled gears 54 and 55 rotate the rods 52 and 53 to which the gate closures 50 and 51 are connected in their lower corners. This rocking of the rods 52 and 53 will move the gates 50 and 51 upwardly which upward movement will be assisted and to a certain extent counterbalanced by the weight 67, after the gate structures reach and pass slightly above a radial line of maximum gravity action to close them, the weight 67 will have reached the ground where they will rest until the gate almost reaches the terminal of its closing movement, at which time they will be raised off the ground to counterbalance the lowering action of the gate and prevent such jars to the gate at the terminal of their movement. After the vehicle has passed through the opening normally closed by the gates 50 and 51, the outer front wheel thereof will engage the obstructions 60 which will have been moved into a vertical position by the opening of the gate and rock a rod 57 which will rotate the rods 52 and 53 in the reverse direction to which they were rotated by the initial rotation of the rods 56, thus moving the gates into a closed position in the same manner in which they are moved into an open position by the rocking of the rod 56. This closing movement will also rock the rod 56 to return the crank or obstruction member 58 into its vertical position while the crank 60 will be moved into its horizontal or lowered position.

A vehicle approaching the gates 50 and 51 from the right of Fig. 7 will engage the obstruction 61, by its forward outer wheel and rock the rod 57, for imparting rocking movement to the rods 52 and 53, to open the gate, which will move the obstruction 59 into a vertical position to be engaged by the front outer wheel of the vehicle after it has passed through the gate opening, for rocking the rod 56 to move the gates 50 and 51 into closing position.

Changes in details may be made without departing from the spirit of this invention, but;

I claim:

1. The combination with a pair of closure members mounted to swing about a vertical axis, and including outer side members, of a pair of rockable rods supported one upon each side of the closure members, means carried by said rods whereby the rods will be rocked by a vehicle approaching or leaving said closure members, operating rods positioned intermediate the closure members, and rockable rods, flexible means connecting the outer ends of the rockable rods with the outer ends of the operating rods, flexible means connecting the inner ends of the rods with the gate closures, a rigid abutment engaging the lower inner corners of said closure members to limit the swinging movement thereof in one direction, a pivoted abutment adapted for co-action with said rigid abutment to restrain swinging movement of said closure members, and an operating rod positioned intermediate the first mentioned operating rods and connecting said rockable rods with the pivoted abutment to operate the latter to permit swinging movement of the gates upon rocking movement of the rockable rod.

2. The combination with a pair of swingable closure members including outer side rods, of rods rockably supported on each side of the closure members, crank portions formed upon said rods, means operatively connecting the rockable rods with the side rods of said closure members for swinging the latter upon rocking movement of the rockable rods, a rigid abutment engaging the lower inner corners of said closure members to limit the swinging movement thereof in one direction, a pivoted abutment adapted for coaction with said rigid abutment to restrain swinging movement of said closure member, a depending right angularly extending foot formed on said pivoted abutment, operating rods positioned intermediate the rockable rods and the pivoted abutment, flexible means connecting the outer ends of said operating rods with said rockable rods, and means slidably and pivotally connecting the inner ends of said operating rods with the depending foot thereof.

ERNEST A. RUCK.